United States Patent
Wang et al.

(10) Patent No.: US 7,213,936 B2
(45) Date of Patent: May 8, 2007

(54) STRUCTURE OF DIRECT TYPE BACKLIGHT MODULE WITH HIGH UNIFORM EMITTING LIGHT

(75) Inventors: Jyh Horng Wang, Jhongli (TW);
Jen-Huai Chang, Jhongli (TW);
Kai-Hsin Li, Jhongli (TW)

(73) Assignee: Entire Technology Co., Ltd., Taoyuan County (TW)

( * ) Notice: Subject to any disclaimer, the term of this patent is extended or adjusted under 35 U.S.C. 154(b) by 186 days.

(21) Appl. No.: 11/041,705

(22) Filed: Jan. 25, 2005

(65) Prior Publication Data
US 2006/0007703 A1    Jan. 12, 2006

(30) Foreign Application Priority Data
Jul. 9, 2004    (TW) .............................. 93210889 U

(51) Int. Cl.
*F21V 5/00*    (2006.01)
(52) U.S. Cl. .................. 362/223; 362/225; 362/242; 362/246; 362/335; 359/619
(58) Field of Classification Search ............... 362/23, 362/29, 223, 224, 225, 237, 240, 242, 244, 362/246, 332, 333, 335, 336; 359/599, 619, 359/627
See application file for complete search history.

(56) References Cited

U.S. PATENT DOCUMENTS

| | | | | |
|---|---|---|---|---|
| 4,924,356 A | * | 5/1990 | French et al. | 362/607 |
| 5,791,639 A | * | 8/1998 | Johnston et al. | 269/41 |
| 6,280,063 B1 | * | 8/2001 | Fong et al. | 362/333 |
| 6,795,241 B1 | * | 9/2004 | Holzbach | 359/463 |
| 6,970,288 B2 | * | 11/2005 | Ebina et al. | 359/455 |
| 2003/0039030 A1 | * | 2/2003 | Myers | 359/449 |

* cited by examiner

*Primary Examiner*—Thomas M. Sember
(74) *Attorney, Agent, or Firm*—Rosenberg, Klein & Lee

(57) ABSTRACT

A structure of direct type backlight module with high uniform emitting light explores a design of lenticular lens of diffusing plate. The lenticular lens is against the central location of light source, where the light of lamp is scattered and the curvature of said lenticular lens far away light source is enlarged, then to reduce the scatter effect and achieve uniformity. The other lenticular lens also can be designed for light location and distance. Each lenticular lens is against light location, and incident light can be reflected through the angle of microstructure surface at the entrance facet, but farther location can be resulted in total refraction due to large inclined angle, and diminishing the transmission light of light source then influencing the uniformity, finally reducing total reflection of wide angle.

5 Claims, 5 Drawing Sheets

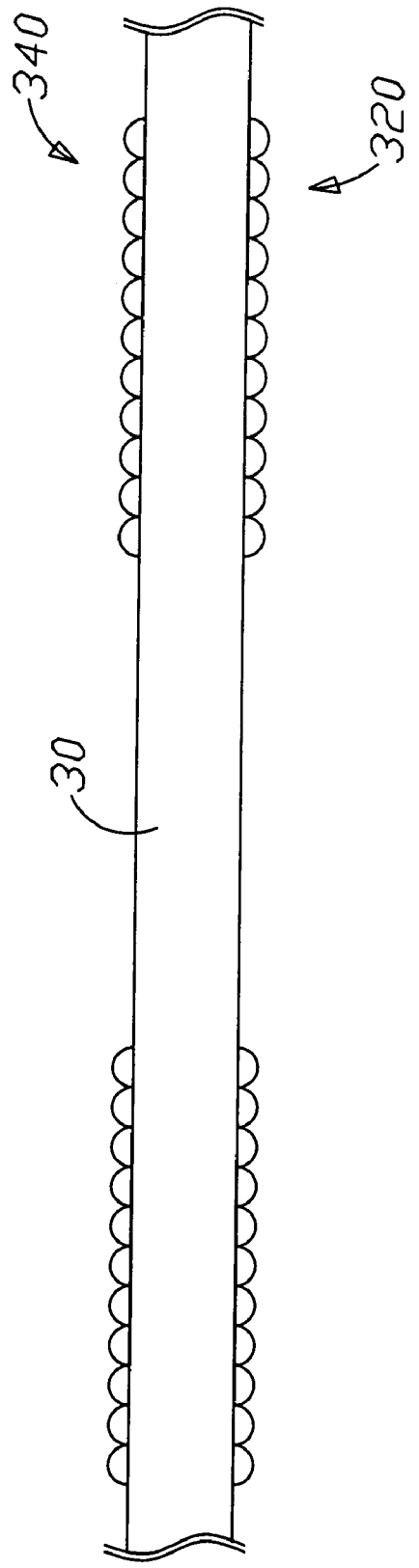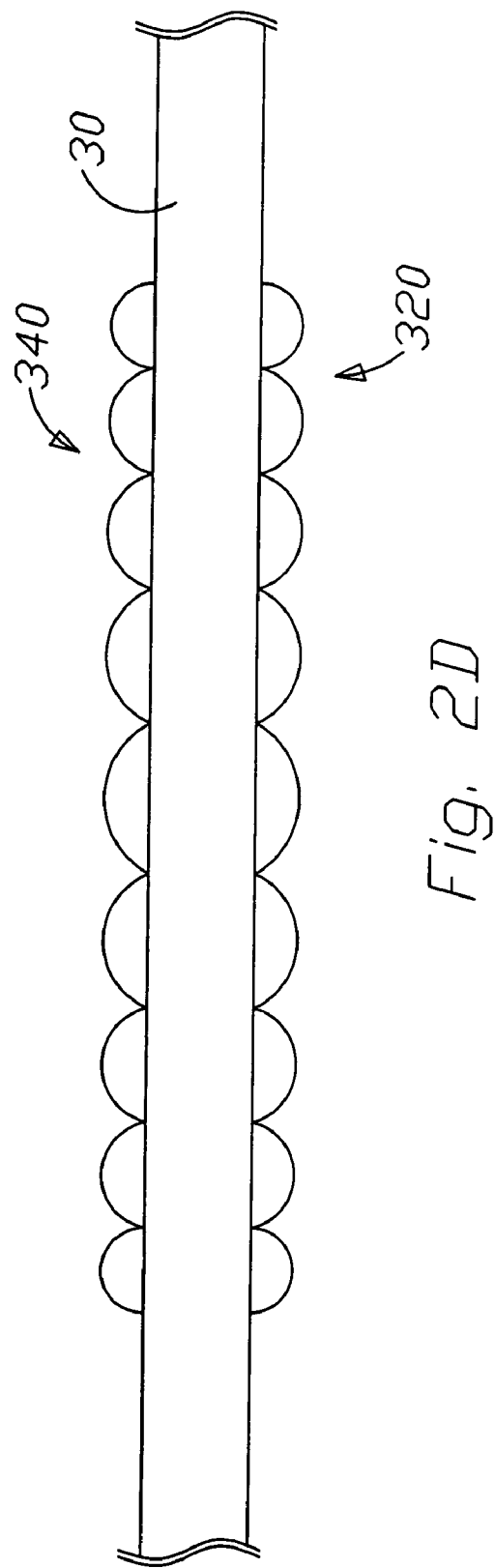

STRUCTURE OF DIRECT TYPE BACKLIGHT MODULE WITH HIGH UNIFORM EMITTING LIGHT

BACKGROUND OF THE INVENTION

1. Field of the Invention

The present invention relates to a structure of direct type backlight module with high uniform emitting light, which emphasizes on a direct type backlight module with high efficiency of light diffusion and transmission and low-cost diffusing plate.

2. Description of the Related Art

With the increment of HDTV, DVD player and Digital TV requirement, consumers are more and more concerned about the image quality of television. Besides, some defects of conventional CRT TV are high power consumption, high radiation, blinking, and heavy weight. Therefore, new generation display device having high solution in different monitors competition during these years has gradually placed CRT. Liquid crystal display with potential display technology has been always highly concerned for new generation display. The manufacturers in Japan, Taiwan and Korean are devoted into LCD technology research and adopting large-scale production equipment, therefore, the quality of LCD has been continuously improved and marketing price is getting down which bring the requirement of LCD and more criteria on related technology. The image of liquid crystal monitor is controlled by electric fields power, but liquid crystal panel itself can not emit light and provides monitor light through backlight module. Generally speaking, LCD has two different kinds of backlight source that are side type and direct type. Side type backlight source cannot provide high brightness and uniform light on the application of large-size liquid crystal monitors, due to being influenced by lamp tubes and light transmission distance. On the contrary, direct type backlight can achieve the criteria of large-size liquid crystal monitor through increasing lamp tubes and diffusion device design. Besides, light guide plate of side type backlight module will increase thickness while size is enlarged to achieve uniform distribution of light. According to the calculation, the weight of light guide plate whose average brightness 5000 cd/m2 for 21" is over 2 kilogram. The trend of present monitor is towards to light weight, the weight of light guide plate becomes a significant criterion. Using light diffusing plate can reduce in a range of from 60 to 80% weight that has obvious advantage for the application of large-size backlight module.

Light diffusing plate of direct type backlight module replacing light guide plate of side type is an important component to have scattering and uniformity light. The primary function of "Light diffusing plate" is to scatter light, such as light box, light signboard, even the light box which using for X-ray examination in the hospital, that all use the similar diffusing plate to scatter the light uniformly. That causes in good effect on light scattering. Although the diffusion efficiency of early diffusing plate fits the requirement, the light transmission ratio and uniformity are still not good for display application, whose defect is the insufficient brightness. Generally speaking, the transmission rate of the whole light field of these diffusing plates are in a range of from 30 to 50% that has already not satisfied the consumer's requirement, under the trend of high brightness of display. Japanese diffusing plate manufacturers devote to solve these defects recently, by adding different categories of light dispersant and strictly controlling the process, the light transmission efficiency and uniformity has been successfully improved. Although transmission rate has increased in a range of from 50 to 70%, the transmission rate is not satisfied by the customers as high criteria product. On the other hand, in order to achieve the design of thinner monitor product, backlight module has to develop towards to light-weight and thin, therefore, the higher diffusion efficiency is required. But much light diffusion dispersant has been used for diffusing plate and causes in reducing transmission rate. In brief, high diffusion and transmission rate for the present diffusing plate are hardly presented at the same time. There is only way to satisfy the requirements of high brightness and diffusion is to modify the structure of diffusing plate or backlight module. The manufacturers of LCD TV or backlight module adopt a method that is to use a diffusing plate with higher transmission rate. The vestige of CCFL can not be uniformed by diffusing plate, therefore, 1 to 2 diffuser put at the emitting facet of diffusing plate to achieve the effect of light scattering again which resulted in a range of from 5 to 10% light energy loss, then accommodating to prism sheet to bring light and counterbalance the loss. Finally, the purpose of thin and lightweight backlight module can be implemented but resulted in huge increment of cost and lessening the visible angle of TV.

Liquid Crystal Display itself cannot emit light and requires backlight module to provide light source for monitor. Diffusing plate is an important component of backlight module for light scattering. The function of diffusing plate is to scatter light uniformly emitting from CCFL to provide stable and uniform light source for liquid crystal panel. Moreover, the brightness and quality of LCD are very related to the efficiency of light source. In order to increase the effect of light scattering, the light dispersant is added into said diffusing plate, but the price of light dispersant is very expensive.

Therefore, to propose a structure of direct type backlight module with high uniform emitting light, according to the aforementioned problems, which enable to solve the defects of using much, light dispersant for diffusing plate and to increase light diffusion and transmission and cost effectively. Based on the inventor engaging on the research and develop and sales experiences for the related products for many years, the inventor finally proposes a method to solve the aforementioned problems for a structure of direct type backlight module with high uniform emitting light.

SUMMARY OF THE INVENTION

The primary object of the present invention is to provide a structure of direct type backlight module with high uniform emitting light, wherein using a structure of diffusing plate to increase light diffusion, transmission rate and save fabrication cost. There are plural lenticular lens on the surface of entrance facet of said diffusing plate and the interval two lenticular lens of said plural lenticular lens is half interval of two light source of plural light source. Moreover, the location of said lenticular lens is set against the center of light source to reduce total reflection at wide angle.

The secondary object of the present invention is to provide a structure of direct type backlight module with high uniform emitting light, wherein said lenticular lens is set against the center of light source. The curvature of said lenticular lens is increasing while being away from light source. While the curvature of said lenticular lens is enlarged, the effect of light scatter is reduced and the purpose of uniformity is implemented.

Another object of the present invention is to provide a structure of direct type backlight module with high uniform emitting light, wherein provides a design of lenticular lens for diffusing plate. The lenticular lens of the present invention is against center of lamp to scatter light of said lamp area. Location is farther away from lamp, the curvature of said lenticular lens is larger, then the effect of light scatter is reduced and the purpose of uniformity is implemented. Design of another lenticular lens also focuses on the lamp location and distance and are set compound. Each set of lenticular lens is against the CCFL location to fit the effect of design of lenticular lens. The inclined light can be refracted through the angle of microstructure surface at entrance facet, but more distance location can be resulted in total refraction due to large inclined angle, then reducing the transmission light of light source and influencing the uniformity, finally reducing total reflection of wide angle. Except lenticular lens, diffusion plate itself contains sufficient light dispersant can make the light scattered and result in uniformity.

Moreover, providing a double side lenticular lens at entrance and exit facet and making a lenticular lens having the same direction with entrance facet can be towards to horizontal direction to cover or scatter the lamp marks.

BRIEF DESCRIPTION OF THE DRAWINGS

FIG. 2C is a structure diagram showing diffusing plate of another preferred embodiment of the present invention.

FIG. 2D is a structure diagram showing diffusing plate of another preferred embodiment of the present invention.

DETAILED DESCRIPTION OF THE PREFERRED EMBODIMENTS

In order to clearly express and explore the feature characteristics and efficiency of the present invention for the committee of patent, the preferred embodiment and detailed description is as below.

The present invention is to add lenticular structure at the entrance facet of diffusing plate, each structure is set against the location and design of light source, and through light refraction or reflection to change the path of light movement while light passing lenticular lens to achieve the effect of scattering light. Besides, the feature and distribution of microstructure can be changed by optical design and to allot the angle of inclined light then to meet the requirements of backlight module. To enhance the diffusion of diffusing plate for conventional diffuser design can have very good effect for covering light source, but the transmission rate can be reduced. Only focus on increasing diffusion around lamp part at the present invention can lower the transmission rate to the least and implement the purpose of brightness.

Due to the expensive light dispersant, the novel design can increase light diffusion through lentricular lens and reduce the increment of light dispersant. The novel design enables to reduce the absorption or refraction resulting form light dispersant to enhance transmission rate and also reduce the cost of raw materials for products. Whether using extruding or casting method to produce the plate that will not increase production complexity and be easy to produce. Therefore, the novel diffuser design has advantages of enhancing diffuser function and lowering cost.

Besides, designing lenticular lens at the location close to light source which has brighter light, then the light is scattered to the darker area which reduces the brightness of light source and enhances the scatter uniformity, then the low transmission rate resulted from lenticular lens can be reduced.

Figure 1:
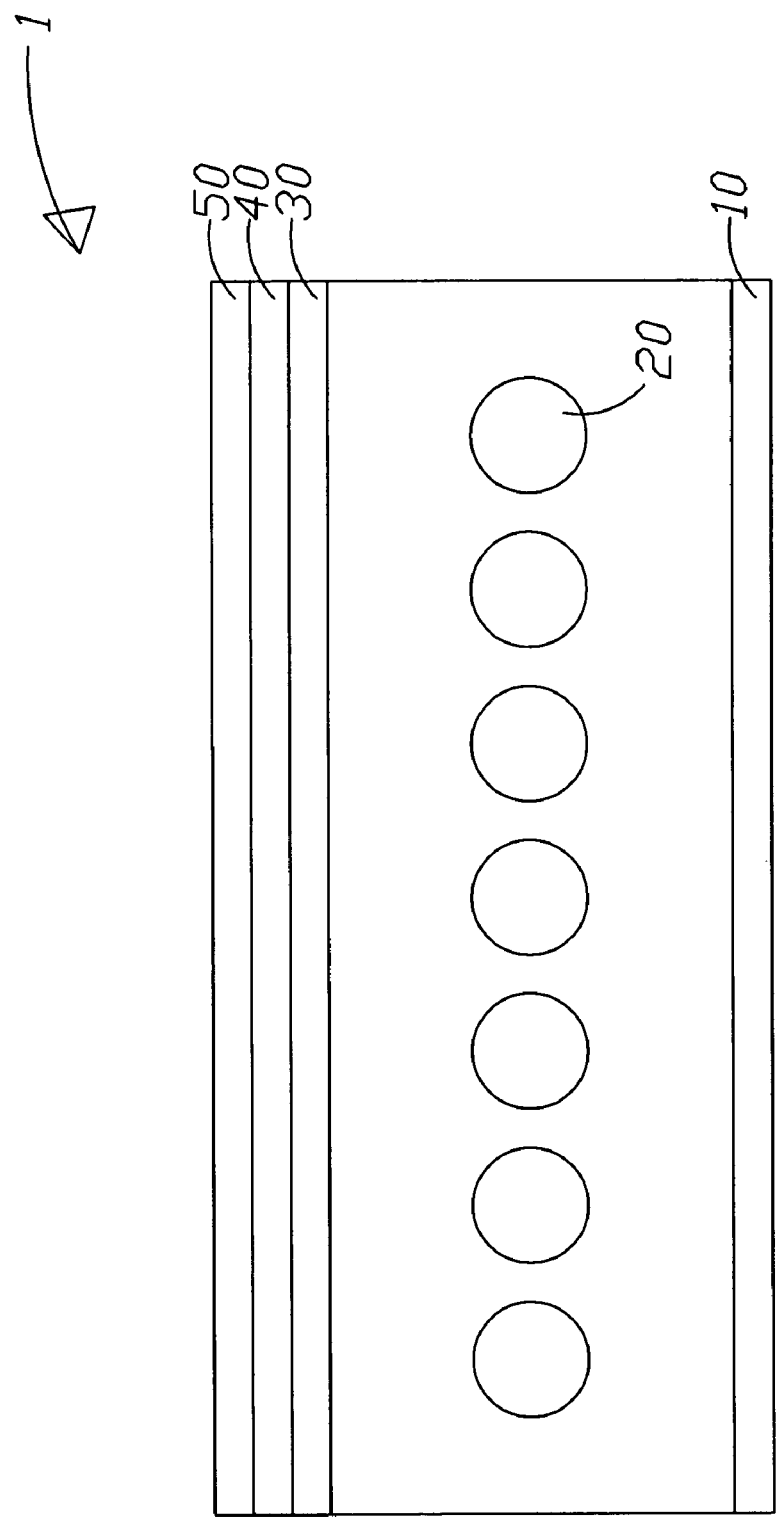
FIG. 1 is a structure diagram showing direct type backlight module of preferred embodiment of the present invention.
Figure 1A:
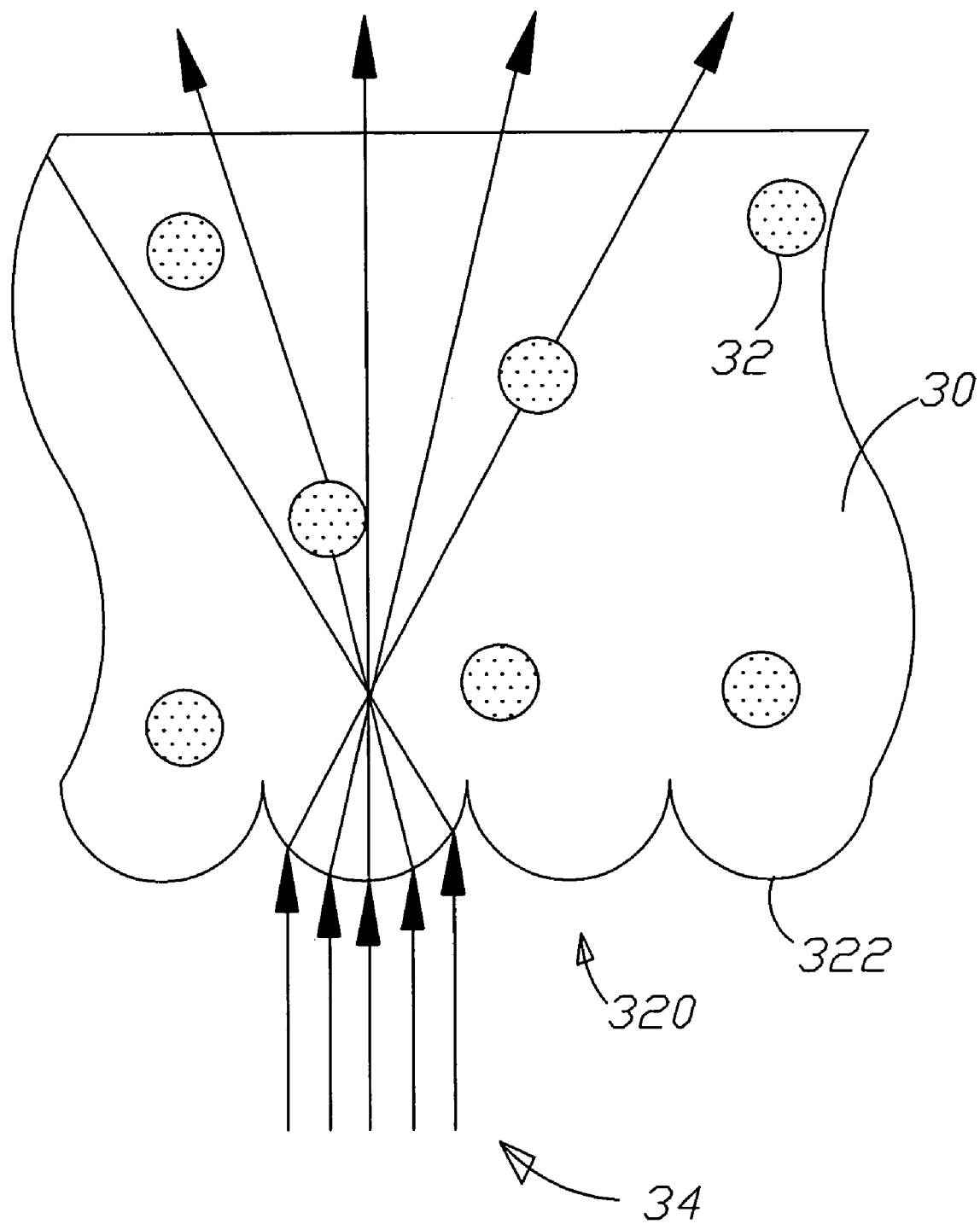
FIG. 1A is diagram showing a light proceeding route within diffusing plate of preferred embodiment of the present invention.

Refer to FIG. 1, which illustrates the structure diagram of one of the preferred embodiment of direct type backlight module. As FIG. 1 showing, the present invention illustrates a structure of direct type backlight module with high uniform emitting light, wherein said direct type backlight module 1 consisting of a reflector 10; plural light source 20 locating above said reflector 10; a diffuser 30 locating above said plural light source 20; a prism sheet 40 locating above said diffuser 30; and a panel 50 locating said prism sheet 40.

Refer to FIG. 1, wherein said plural light source 20 is Code Cathode Fluorescent Tube (CCFL); the material of said diffusing plate 30 is selected from one of acrylic resin, epoxy resin, PU, transparent thermosetting resin or UV curable resin, and said diffusing plate 30 consists of plural light dispersant 32. The technology characteristics of the present invention is plural lenticular lens 322 setting at the surface of entrance facet 320 of said diffusing plate 30 which through refraction or reflection to change the path of light movement while light 34 passing lenticular lens 322 to achieve the effect of scattering light.

Figure 2A:
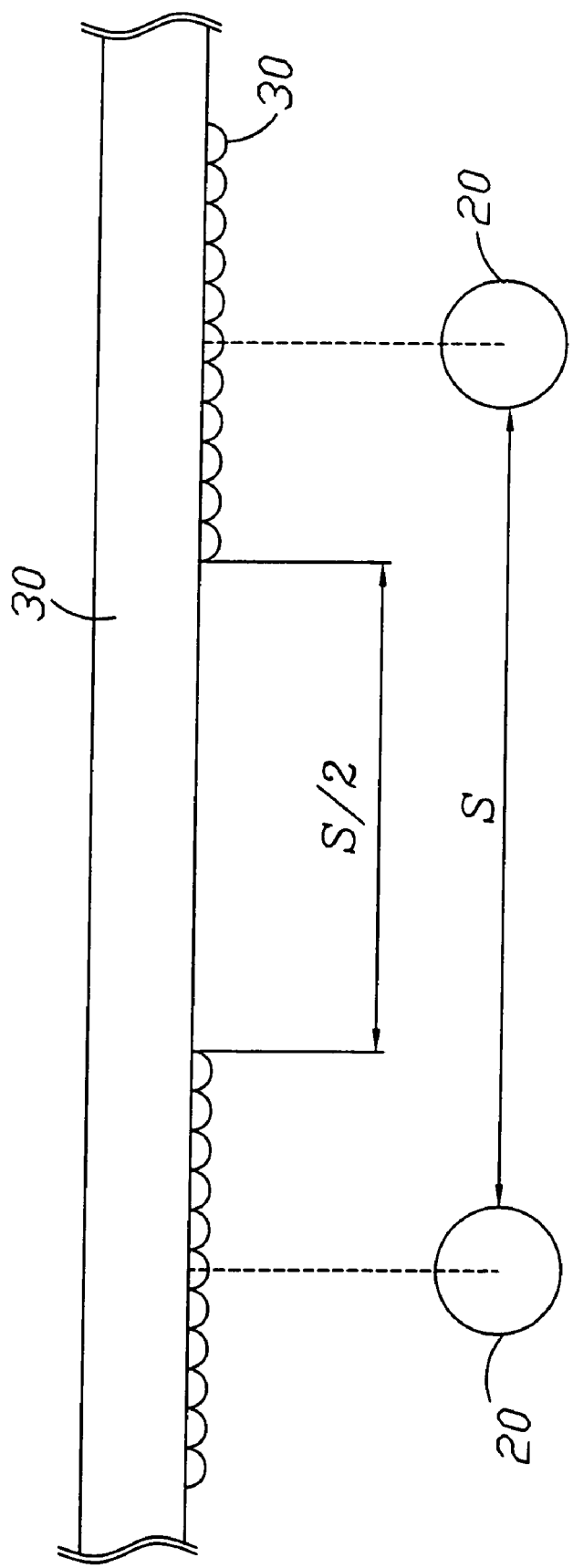
FIG. 2A is a structure diagram showing diffusing plate of preferred embodiment of the present invention.

Moreover, the present invention focuses on the location of said lenticular lens 322, refer to FIG. 2A, which illustrates the structure diagram of one of the preferred embodiment of diffusing plate. As FIG. 2A showing, the present invention explores plural lenticular lens 322 on said diffusing plate 30 and the surface of entrance facet connecting said plural light source 20. The interval of said plural light source and said lenticular lens are S and S/2 respectively, and each structure is set against the location and design of light source, then through refraction or reflection to change the path of light movement while light passing lenticular lens to achieve the effect of scattering light.

Figure 2B:
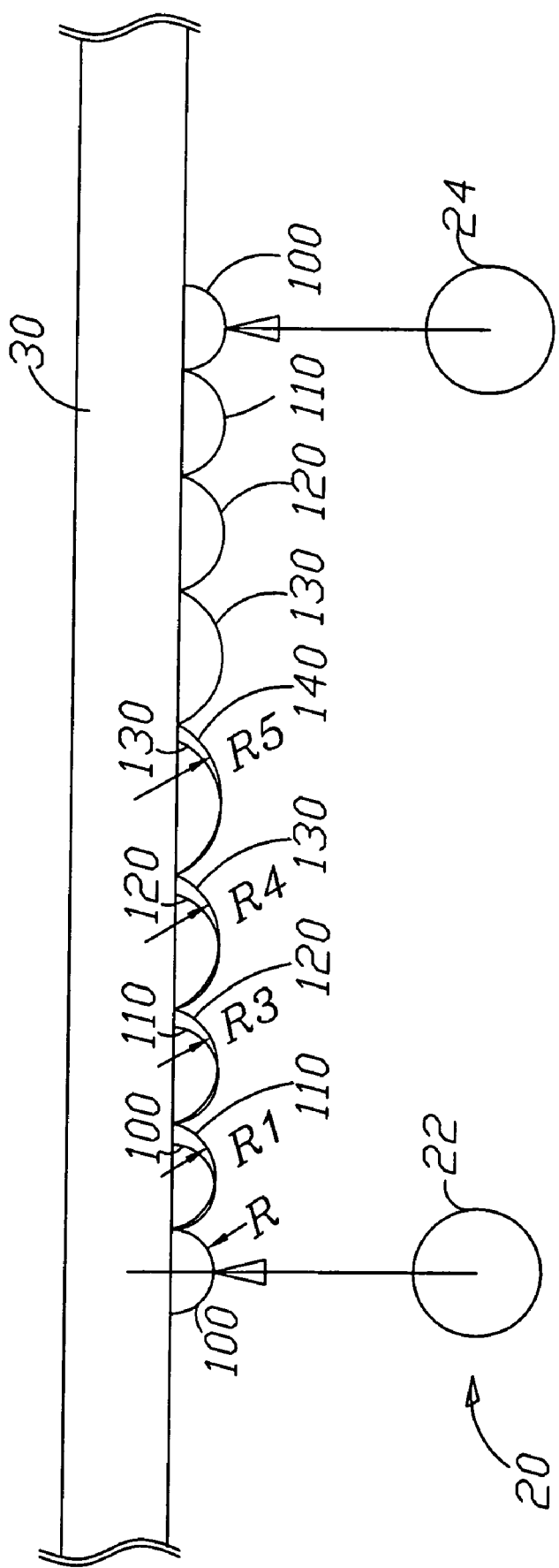
FIG. 2B is a structure diagram showing diffusing plate of another preferred embodiment of the present invention.

Refer to FIG. 2B, which illustrates the structure diagram of one of the preferred embodiment of diffusing plate. As FIG. 2B showing, the present invention explores that the feature and distribution of microstructure can be changed by optical design and to allot the angle of inclined light then to meet the requirements of high brightness and uniformity for backlight module. To enhance the diffusion of diffusing plate for conventional diffuser design can have very good effect for covering light source, but the transmission rate can be reduced. Only focus on increasing diffusion around lamp part at the present invention can lower the transmission rate to the least and implement the purpose of brightness. Plural lenticular lens 322 locates on said diffusing plate 30 and the surface of entrance facet connecting said plural light source 20, the distribution of curvature of said plural lenticular lens is increased from the first light 22 with minimum curvature to the central location between said first and the second light 24 with maximum curvature, then curvature is diminished to said second light with minimum curvature. Therefore, the curvature of the first lenticular lens 100 is R1, one of the second lenticular lens 110 is R2, one of the third lenticular lens 120 is R3, one of the fourth lenticular lens 130 is R4, and one of the fifth lenticular lens 140 is R5, the value of said curvature is R5>R4>R3>R2>R1.

Refer to FIG. 2C and 2D, wherein the lenticular lens of said FIG. 2A and 2B is set at the surface of an entrance facet 320 and an exit facet 320.

There are three types of forming diffusing plate with lenticular lens as follows:

1. Directly forming while extruding plates. Processing on the surface of cooling roll of one extruder or the other. While extruding plates, the feature of lenticular lens is copied on the plate through the engraving on the surface of cooling roll.
2. Forming by casting mould. Using acrylic monomers proceeds nodule aggregation within the panel glass mould and then finished acrylic product is obtained which is conventional technology. But the present invention is to change the surface morphology of panel mould. Lenticular lens is processed on the metal panel and acrylic plate is cast to make the lenticular lens copied on the finished acrylic plate.
3. Forming by transparent resin on the diffuser. Forming lenticular lens on the metal plate as a mould and resin is uniformly coated on the mould, then the mould is gradually covered by diffuser form one side to the other, finally, the finished product obtained after resin hardening and coming off mould. The resin can be selected from one of acrylic resin, epoxy resin, PU, or other transparent thermosetting resin or UV curable resin.

The following illustrates the best practices.

Embodiment 1

Lenticular lens is formed by using UV resin on the surface of entrance facet at the flat diffusing plate and then compared to conventional flat diffusing plate. The interval period of lenticular lens is 0.2 mm and the radius of curvature of lenticular lens is 0.2 mm, and the interval of lamp is 30 mm, the area of lenticular lens and none lenticular lens are equal whose length and width are 15 mm and interlaced as FIG. 2A. After forming lenticular lens are cut into proper figure and set at the direct type CCFL light source and the center of which aims to lamp location. After measuring, the result is shown as FIG. 3. Horizontal axis means distance and vertical axis means luminance intensity, the distribution of luminance intensity of none lenticular lens of flat diffuser on the module is not uniform. And lenticular lens of diffuser formed on the surface can achieve better diffusion effect and uniformity.

The present invention modifies light diffusion through changing curvature distribution of lenticular lens that is different from the conventional method, which only can amend the increment of light dispersant. Therefore, novel design for product is more stable than traditional one. Moreover, the diffusion effect of light dispersant has no directivity and presents irregular scatter effect, but the scattering light using lenticular lens can be designed to aim at certain direction. For the design of monitor, providing inventor more space to design according to different requirements to enhance the light utilization.

While certain preferred embodiments of the present invention have been disclosed in detail, it is to be understood that various modifications may be adopted without departing from the spirit of the invention or scope of the following claims.

What is claimed is:

1. A structure of a direct type backlight module with high uniform emitting light comprising:
   a reflector;
   a plurality of light sources located above said reflector;
   a diffusing plate located above said plurality of light sources, and a plurality of lenticular lenses located on said diffusing plate;
   each of said plurality of lenticular lenses including an entrance facet adjacent said plurality of light sources, wherein a curvature of each entrance facet is increased from a first light source to a central location of said diffusing plate, located between said first light source and a second light source; a curvature of each entrance facet is then minimized from said central location to said second light source;
   a prism sheet located above said diffusing plate; and
   a panel located above said prism sheet.

2. The structure in accordance with claim 1, wherein said plurality of light sources are cold cathode fluorescent tubes (CCFLs).

3. The structure in accordance with claim 1, wherein said diffusing plate consist of a plurality of light dispersants.

4. The structure in accordance with claim 1, wherein a surface structure of an exit facet of said diffusing plate is equal to a surface structure of said entrance facet surface.

5. The structure in accordance with claim 1, wherein said diffusing plate is selected from one of acrylic resin, epoxy resin, PU, transparent thermosetting resin or UV curable resin.

* * * * *